(12) United States Patent
Paunovic et al.

(10) Patent No.: US 6,197,364 B1
(45) Date of Patent: Mar. 6, 2001

(54) PRODUCTION OF ELECTROLESS CO(P) WITH DESIGNED COERCIVITY

(75) Inventors: Milan Paunovic, Port Washington; Christopher Jahnes, Monsey, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/373,792

(22) Filed: Aug. 9, 1999

Related U.S. Application Data

(63) Continuation of application No. 08/518,050, filed on Aug. 22, 1995, now abandoned.

(51) Int. Cl.[7] ........................................................ B05D 5/12
(52) U.S. Cl. ................... 427/98; 427/126.1; 427/132; 427/305; 427/437; 427/443.1
(58) Field of Search ..................... 427/98, 126.1, 427/132, 305, 437, 443.1

(56) References Cited

U.S. PATENT DOCUMENTS

| | | | |
|---|---|---|---|
| 3,895,124 | * | 7/1975 | Louch .................................. 427/8 |
| 4,250,225 | * | 2/1981 | Shirahata et al. .................. 428/336 |
| 4,659,605 | * | 4/1987 | Malik et al. ....................... 427/129 |

\* cited by examiner

*Primary Examiner*—Brian K. Talbot
(74) *Attorney, Agent, or Firm*—Thomas A. Beck

(57) ABSTRACT

This invention provides a method and solution for the electroless deposition of Co(P) with a designed coercivity via the programmed addition of supporting electrolytes comprising such sulfur containing compounds as sulfamic acid, potassium sulfate or sodium sulfate to a solution having a source of cobalt ions, a source of citrate ions, a buffering compound to stabilize the pH of the solution, a source of hypophosphite ions and sufficient hydroxide anions to obtain a pH of between about 7 and 9. The magnetized Co(P) material is useful in, for example, rigid magnetic storage disks, hard bias layers for MR thin film heads and magnetic detector tags.

13 Claims, 3 Drawing Sheets

PRODUCTION OF ELECTROLESS CO(P) WITH DESIGNED COERCIVITY

CROSS-REFERENCE TO RELATED APPLICATION

This is a continuation of application Ser. No. 08/518,050 filed Aug. 22, 1995 now abandoned.

The invention disclosed and claimed herein is related to the invention disclosed and claimed in application Ser. No. 08/370,129 filed Jan. 9, 1995 now abandoned, and assigned to the same assignee as the present invention.

FIELD OF THE INVENTION

The invention relates to production of electroless Co(P) with a specially designed coercivity via the programmed addition of supporting electrolytes comprising such sulfur containing compounds as sulfamic acid or sodium sulfate.

BACKGROUND OF THE INVENTION

The electroless deposition of cobalt-phosphorus films emphasizing such magnetic properties as coercivity, hysteresis loop squareness and remanence is well known in the art. The coercive force of a magnetic material, typically measured in oersteds, is significant because it is a measure of the opposing magnetic intensity that must be applied to a magnetic material to remove the residual magnetism when the material has been magnetized to saturation. The magnetized material, for example, can be used in rigid magnetic storage discs, hard bias layer for MR thin film heads, magnetic detector tag applications (bias or shunt layers).

In making a magnetic layer suitable for use in a rigid magnetic storage disc, electroless Co(P) deposited from solution containing cobalt sulfate, sodium citrate, boric acid, sodium hypophosphite and sodium hydroxide results in a hard magnetic material possessing a coercivity ($H_c$) of 510 Oe. In accordance with the present invention, if varying amounts of a sulfur containing compound, such as sulfamic acid, is added to the electroless plating solution having the composition described above, the coercivity can be varied and soft magnetic materials having $H_c$ as low as 1.6 Oe can be obtained.

U.S. Pat. No. 3,138,479 discloses Co(P) coercivity in the range of 400–450 Oe which was obtained by varying the pH and agitation. The plating bath includes cobalt chloride, ammonium chloride, sodium citrate and sodium hypophosphite.

U.S. Pat. No. 3,378,400 discloses nickel and cobalt coatings and their alloys deposited upon metallic and non-metallic surfaces and discloses the use of sulfamic acid and nickel or cobalt salts thereof in the metallic plating solution. No magnetic properties are disclosed in this reference.

U.S. Pat. No. 3,360,397 discloses coercivity of Co(P) in the range of 25–850 Oe; the coercivity was varied by changing the concentration of two complexing agents in the deposition solution.

U.S. Pat. No. 3,423,214 discloses electroless deposition of ferromagnetic metals such as cobalt and cobalt based alloys and specifically reports on coercivity of Co(P) in the range 110–235 Oe. The coercivity in this reference was varied by changing the concentration of the complexing agent in the deposition solution.

U.S. Pat. No. 3,447,657 discloses coercivity of Co(P) in the range of 350–950 Oe which was also varied by changing the concentration of the complexing agent.

U.S. Pat. No. 3,523,823 discloses a "soft" magnetic memory film of the nickel-cobalt type electrolessly plated onto a ceramic substrate. The reference discusses the magnetic properties of alloys and discloses coercivities in the range of 0.5–15 Oe.

U.S. Pat. No. 4,150,172 discloses variation of pH of the plating solution results in varying coercivity of Co(P) from 300–1000 Oe.

U.S. Pat. No. 4,659,605 discloses varying temperature, time of deposition and pH of the plating solution results in Co(P) coercivity from 300–1000 Oe.

IBM Technical Disclosure Bulletin 01-62, p.52–53 discloses coercivity in the range from 40 to 700 was obtained by varying concentration of complexing agent or by adding $Ni^{+3}$ as the alloying ion.

IBM Technical Disclosure Bulletin 03-64, p. 65–66 discloses coercivity in the range from 150 to 900 was obtained by addition of $Fe^{+2}$ as the alloying ion.

IBM Technical Disclosure Bulletin 07-65, p.209 discloses coercivity in the range from 50 to 600 Oe was obtained by varying pH using ammonia or a buffering agent such as sodium tetraborate.

The present invention differs from the prior art disclosures cited above because the coercivities of Co(P) of the present invention span a wide range starting from softer magnetic material with 1.6 Oe to a hard material of 550 Oe. The Co(P) of the present invention includes both soft and bard magnetic materials. The prior art references recognized only Co(P) in the range of hard or soft but not the possibility for making both types of materials from a single bath.

Variation in the coercivity of Co(P) in this invention was achieved by changing the concentration of a non-reactant in the deposition solution such as sulfamic acid, $H_3NO_3S$ or sodium sulfate. In the references cited above, variation in coercivity was achieved by changing the concentration of reactants (complexing agents, —OH, [pH]), temperature or agitation or both. In the present invention, by varying the concentration of a non-reactant, it was possible to control the structure of the solution/substrate interphase (the electrical double layer) which provides a control of the Co(P) crystallization process and coercivity of the Co(P) deposit.

SUMMARY OF THE INVENTION

The broad aspect of the present invention relates to Co(P) magnetic thin films with a designed coercivity ranging from a soft magnet to a hard magnet, produced using programmed changes of only one component of the electroless Co(P) deposition solution. Obviously, the characterization of whether a magnet is "hard" or "soft" is a relative term. The present invention provides a means to make thin magnetic films having varying coercivities from a single electroless solution. When a "hard" coercivity is desired, the solution, as set forth below is used. If a softer coercivity is desired, the identical solution is used and a source of sulfamate ions is added thereto.

The electroless solutions used are prepared with analytical grade reagents and distilled water. The complexing agent for $Co^{++}$ ions in the electroless deposition solution is a citrate ion ($C_6H_5O_7^{3-}$), the buffer can be boric acid ($H_3BO_3$), Na(OH) or a suitable base is added to bring the pH to the proper level which, as is noted hereinafter will range from 7 to 9. The reducing agent used is a source of hypophosphite such as sodium hypophosphite ($NaH_2PO_2.H_2O$) and the source of cobalt ions was cobalt sulfate ($CoSO_4.7H_2O$). The substrate, for example, can be evaporated or sputtered Cu (5000 Å) on a silicon wafer covered with Cr (400 Å) adhesion layer. Prior to electroless deposition, the Cu surface is cleaned in $H_2SO_4$ and $H_2O$ and is activated with $PdCl_2$. The rate of plating (deposition) is determined experimentally by the weight gain method.

DETAILED DESCRIPTION OF THE PREFERRED EMBODIMENTS

Figure 1:
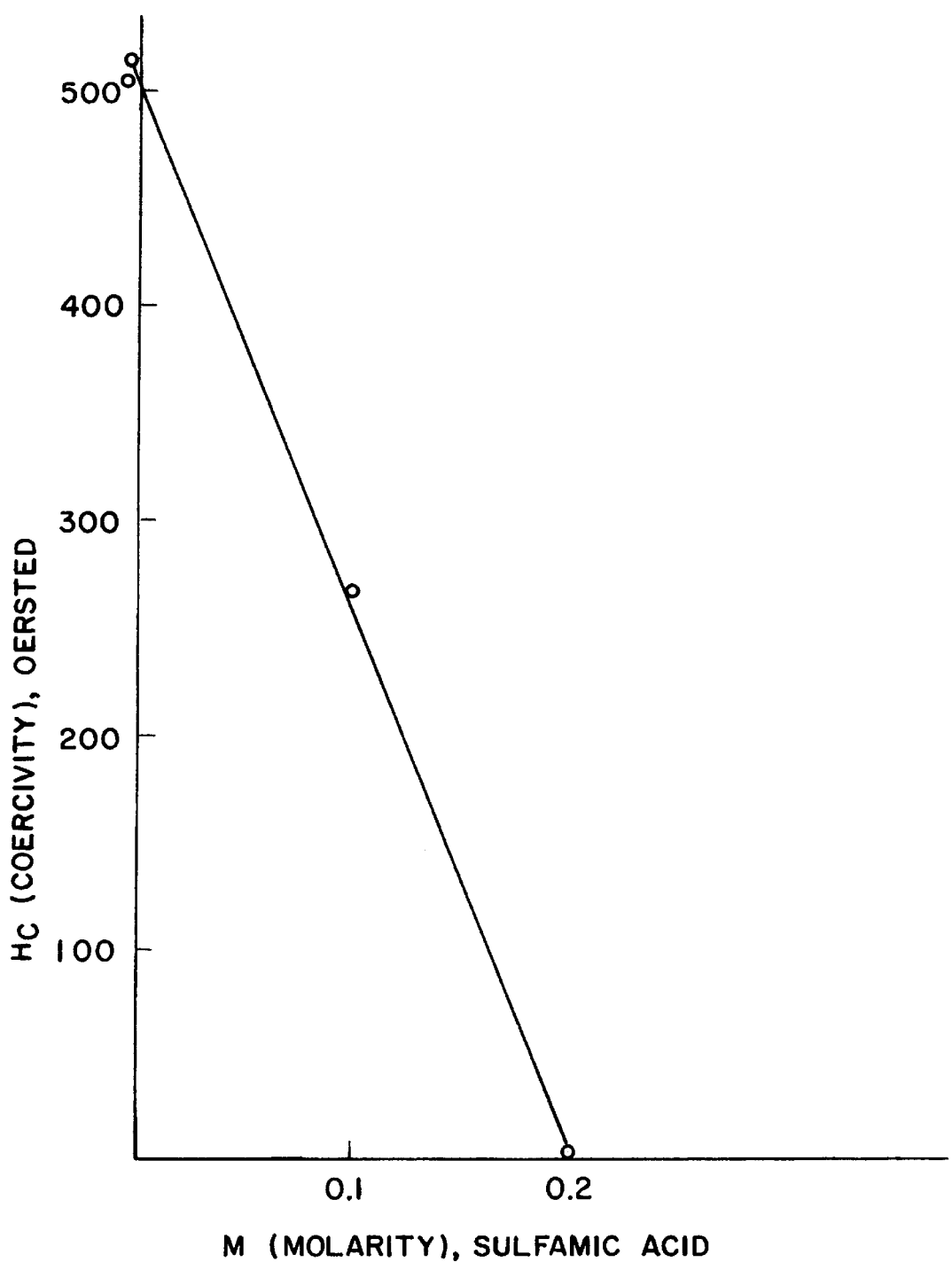
FIG. 1 depicts the dependence of coercity of Co(P) on the concentration of sulfamic acid in the electroless deposition solution deposited on Si/Cr(200 Å)/Cu (1 μm) substrate.

Typically the method of electroless deposition used in accordance with the present invention embodies a tank which contains the plating bath. The substrate is prepared in accordance with known sensitizing/activating procedures and is immersed in the bath.

The substrate used in accordance with the present invention can be any non-water soluble substrate having a suitable metal adhesion layer thereon. The electroless deposition process of the present invention involves deposition of the Co(P) material on the sensitized/activated substrate layer which may be either a conducting or nonconducting surface.

If the substrate is a catalytic surface for the Co(P) deposition, then a standard oxidation-reduction reaction occurs which results in the deposition of the Co(P) layer.

If the substrate surface is not catalytic, then an activation process is necessary to prepare the surface prior to the oxidation reduction reaction. Noncatalytic surfaces, including noncatalytic metals, noncatalytic semiconductors and nonconductors, have to be activated before electroless deposition is possible. Activation is performed by generating catalytic metallic nuclei on the surface of a noncatalytic material. Two types of processes can be used to produce catalytic nuclei: electrochemical and photochemical.

There are two types of activation used in accordance with the present invention. These are selective and non-selective activation processes. These processes are described in detail by Paunovic in Photochemical Selective Activation for Electroless Metal Deposition on Nonconductors, Journal Of The Electrochemical Society, Vol. 127, No. 9, September 1980, p. 442C and by Paunovic and Ting in Selective Electroless Metal Deposition For Integrated Circuit Fabrication, Journal Of The Electrochemical Society, Vol. 136, No. 2, February 1989, p. 456. Other examples of selective electroless deposition are found in U.S. Pat. No. 5,169,680. These articles and this patent are incorporated herein by reference.

The bath is a solution containing cobalt sulfate, sodium citrate, boric acid, sodium or potassium hypophosphite and sodium hydroxide and results in a hard magnetic material possessing a coercivity $H_c$ of 510 Oe. Essentially the same solution is used for the deposition of a Co(P) magnetic material with any desired coercivity from 510 Oe to 2 Oe. This is possible with a programmed addition of another component to the solution. If sodium sulfate is added to the solution of cobalt sulfate, sodium citrate, boric acid, sodium hypophosphite and sodium hydroxide in sufficient amount to make the solution 0.2 M with respect to the sodium sulfate, the Co(P) deposited from this solution has a coercivity of 3.69 Oe and exhibits in-plane magnetic anisotropy.

If, however, sulfamic acid ($H_3NO_3S$) is added to the solution of cobalt sulfate, sodium citrate, boric acid, sodium hypophosphite and sodium hydroxide in sufficient amount to make the solution 0.2 M with respect to the sulfamic acid, the Co(P) deposited from this solution is a soft magnetic material with a coercivity of 3.46 Oe and does not show in-plane anisotropy.

In another illustrative example that the coercivity of Co(P) can be programmed by changing the concentration of the sulfamic acid, Co(P) was deposited from the electroless solution with the addition of sulfamic acid ($H_3NO_3S$) in the amount sufficient to make the solution 0.1 M with respect to sulfamic acid. In this case, Co(P) deposited from solution has a thickness of about 5000 Å and a coercivity of 270 Oe. Accordingly, there appears to be a direct relationship between the concentration of sulfamic acid in the electroless Co(P) solution and the coercivity of the deposited Co(P) as is indicated in FIG. 1. This relationship thus can be used to produce Co(P) with designed coercivity. Similarly, there appears to be a direct relationship between the concentration of sodium sulfate in the electroless Co(P) solution and the coercivity of the deposited Co(P).

If necessary, a seeding operation is carried out on the conductive layer. The solution used to seed contains about 0.4 g/liter palladium sulfate in 1.0 molar sulfuric acid. The range of palladium salt molarity can vary between about 0.1M and 1.0M. For finer features, such as narrow copper conductors having a narrow width deposited on polyimide substrate, a more dilute solution of palladium sulfate is preferred. The seeding operation is carried out for a duration of about fifteen seconds to about two minutes, and at a temperature of about 20° to 30° C. After seeding the conductor layer, the structure is rinsed with a twenty-five g/liter sodium citrate solution to remove absorbed palladium ions from the substrate. The pH of the citrate is preferably about 8 for the purpose of effectively removing palladium ions without etching the copper conductor layer or attacking any insulator material present.

The structure is then immersed in a plating solution that selectively deposits the cobalt-phosphorus alloy. In another embodiment, the solution is composed of sodium citrate, cobaltous sulfate, a phosphorus containing reducing agent such as a hypophosphite, alternatively sodium hypophosphite, and a stabilizer, such as lead ions or a thio-compound, for longer term depositions (on the order of about 30 minutes or longer). The plating reaction is generally:

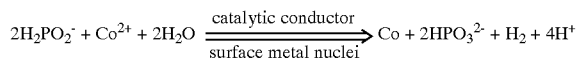

$$2H_2PO_2^- + Co^{2+} + 2H_2O \xrightarrow[\text{surface metal nuclei}]{\text{catalytic conductor}} Co + 2HPO_3^{2-} + H_2 + 4H^+$$

Cobaltous sulfate ($CoSO_4 \cdot 7H_2O$, [F.W. (formula weight) 281.10]) serves as the source of the cobalt ions, and is preferably in the bath in amounts of about three to about fifteen g/liter, with a preferred amount of about 6 g/liter [0.02M]. The hypophosphite is preferably sodium hypophosphite, ($NaH_2PO_2 \cdot H_2O$, [F.W. 105.99]) and is present in the bath as a reducing agent in an amount of about five to twenty g/liter, preferably eight g/liter. Other useful sources of cobalt ions include cobalt chloride and cobalt acetate.

Sodium citrate or trisodium citrate dihydrate ($C_6H_5Na_3O_7 \cdot 2H_2O$, [F.W. 294.10]), alternatively potassium citrate, serves to prevent homogeneous solution plate-out and cobalt hydroxide precipitation by complexing cobalt ions. Generally a higher concentration of sodium citrate results in a greater stability of the plating solution. Specifically, with low sodium citrate concentrations on the order of about thirty g/liter, the rate of deposition decreases with an increase in pH. In contrast, with higher sodium citrate concentrations, such as on the order of about one hundred g/liter, the rate of deposition increases with an increase in pH. Sodium citrate is preferably present in an amount of twenty to about seventy g/liter of solution, most preferably, about twenty to fifty g/liter. While sodium citrate is preferred because it requires minimal pH adjustment to achieve a pH of 8, other substances supplying the citrate ion, such as citric acid, can be used if adjusted to a proper pH.

The plating solution stabilizer may be a lead salt such as lead acetate or lead nitrate, or a thio-compound such as thiodiglycolic acid ($HOOCCH_2SCH_2COOH$). Preferably, about 0.1 to about 2 parts per million (ppm) lead content or about 20 to 40 ppm thio-compound are used in order to achieve a suitably uniform deposition. Additional preffered adjuncts for the plating bath include a pH buffer for maintaining the pH of the bath at about 7 to 9, preferably about 8.0 and a surfactant. A preferred pH buffer is boric acid in amounts of about 10 to 40 g/liter, preferably about 30 g/liter. A preferred surfactant is FLUORAD® FC98, available from 3M Company, in amounts of 0.05 to about 2.0 g/liter, preferably about 0.1 g/liter. It should be noted that although the concentrations given here are in g/liter, it is the molar concentration which determines the plating conditions. For example, when using other salts of cobalt, the g/liter concentration should be adjusted to maintain the same molar concentration of cobalt.

The plating solutions of the present invention, i.e. those with and without sulfamate ions, are extremely stable in comparison with other electroless baths, such as copper, nickel and other cobalt baths. In particular, by maintaining the concentration of sodium citrate above about 15 g/liter and the remaining preferred additives above their respective minimum amounts, the electroless bath of this invention has been found to be extremely stable.

The plating operation is carried out at a temperature of about 75° C., although higher or lower temperatures may be used with corresponding modifications to the duration of the exposure within the plating bath. Plating generally progresses for a duration of about forty to about sixty minutes at 75° C., to result in the desired thickness of about 10,000 Angstroms, but may vary depending upon the desired final thickness of the film.

The embodiments of the present invention can be illustrated by means of the following examples.

EXAMPLE 1

Figure 2:
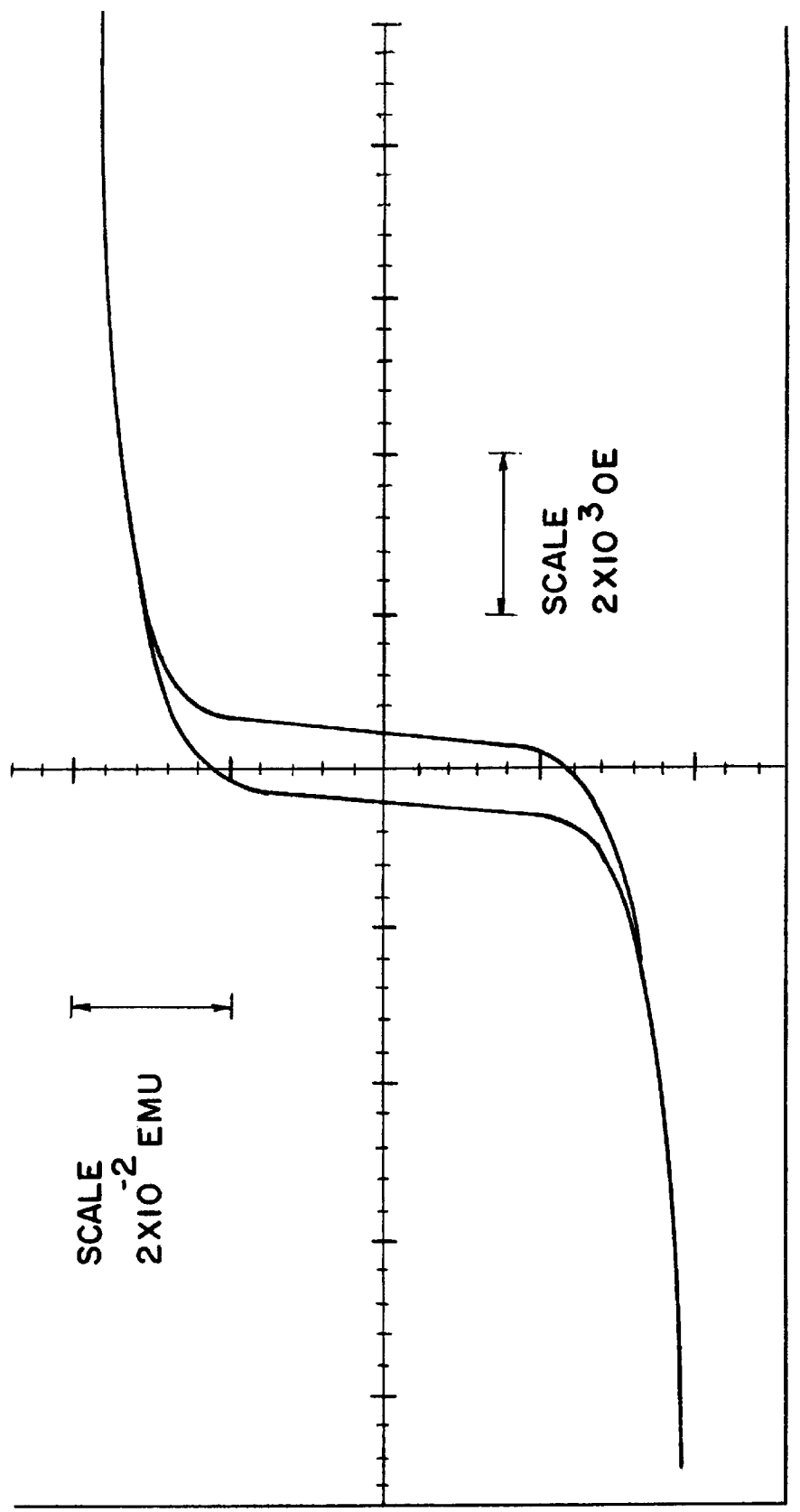
FIG. 2 depicts hysteresis loop for a magnetically hard 3150 Å thick Co(P) deposited on Si/Cr(200 Å)/Cu (1 μm) substrate.

Electroless Co(P) was deposited at 70° C. from a solution containing 0.07–0.1 M citrate ions ($C_6H_5O_3^-$) as the complexing agent for the $Co^{2+}$ ions; 0.3–0.4 M boric acid ($H_3BO_3$) as the buffer: sodium hydroxide to pH 8.00; 0.05–0.07 M sodium hypophosphite as the reducing agent; and 0.02–0.03 M cobalt sulfate as the source of the $Co^{2+}$ ions. The deposited Co(P) is representative of a hard magnetic material with an in-plane coercivity of 514 Oe and no in-plane anisotropy. Out of plane magnetic measurements show a slight component of vertical magnetization. The Co(P) thickness in this example was 3152 Å and a BH loop of this sample is shown in FIG. 2 as an example of a hard magnet.

EXAMPLE 2

Using the procedure and solution detailed in Example 1, electroless Co(P) having a thickness 6156 Å was deposited. Upon inspection, the product was a hard magnetic film having a coercivity of 514 Oe and no observed anisotropy.

EXAMPLE 3

Sufficient sulfamic acid was added to the solution detailed in Example 1 to result in a solution that was 0.05 M with respect to the sulfamic acid. The deposited Co(P) was 4107 Å thick and possessed a coercivity of 279 Oe with no observed in-plane anisotropy.

EXAMPLE 4

Figure 3:
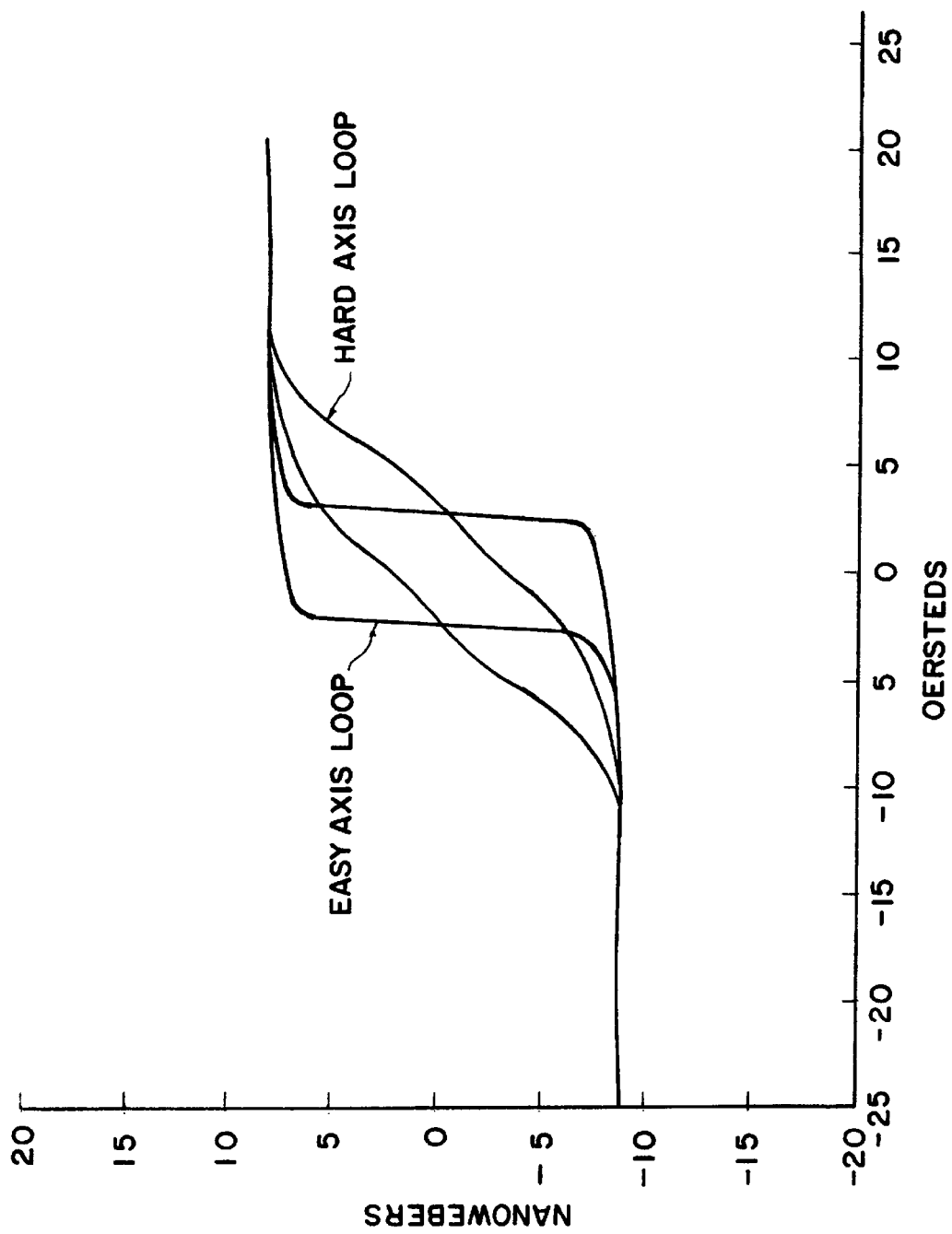
FIG. 3 depicts hysteresis loops for a magnetically hard 3655 Å thick Co(P) deposited on Si/Cr(200 Å)/Cu (1 μm) substrate showing hard and easy loops.

The concentration of the sulfamic acid solution of Example 3 was increased and the deposited Co(P) had lower coercivity and was a soft magnetic film. At a 0.2 M sulfamic acid concentration and a 3655 Å deposit thickness of Co(P), the easy axis coercivity is 2.61 Oe. In addition, although no intentional magnetic field was used during film growth, the film exhibits in-plane anisotropy with an $H_k$ of 11.1 Oe. In this case the in-plane easy axis alignment may be due to stray magnetic fields. This example is illustrated in FIG. 3. For the same solution and a Co(P) thickness of 6124 Å coercivity for the easy axis is 1.64 Oe and the observed anisotropy was 10.8 Oe.

EXAMPLE 5

Addition of sodium sulfate to the solution of Example 1 produces results similar to results obtained with sulfamic acid. Sufficient sodium sulfate was added to the solution detailed in Example 1 to result in a solution that was 0.2 M with respect to the sodium sulfate. The Co(P) was deposited to a thickness of 3395 Å. The in-plane coercivity of the deposited Co(P) was 5.21 Oe with no observed anisotropy. The lack of anisotropy may be due to the higher coercivity compared with the sample of Example 4. For the same plating solution and a Co(P) thickness of 6108 Å, the easy axis coercivity was 2.769 Oe and the sample showed a slight in-plane anisotropy.

Having thus described our invention what we claim as new and desire to secure as Letters Patent, is:

1. A method of depositing from a single electroless plating bath a Co(P) magnetic film on a substrate, said Co(P) film having a variable coercivity of between about 510 Oe and 1.6 Oe, comprising the following steps:

(a) preparing an electroless plating solution consisting essentially of a source of cobalt ions, a source of citrate ions, a buffering compound to stabilize the pH of said plating solution, a source of hypophosphite ions and sufficient hydroxide anions to obtain a pH between about 7 and 9 and a sulfamate non-reactant compound selected from the group consisting of sodium sulfamate, potassium sulfamate, and sulfamic acid, said sulfamate compound present in concentrations ranging from trace amounts to 0.2M to obtain a plating solution; and (b) immersing said substrate in said plating solution for a time sufficient to produce, at a constant rate, a film on said substrate, said film having a range of coercivities between about 1.6 Oe and 510 Oe, the exact coercivity of said film having a direct linear relationship to the concentration of said sulfamate compound, such that trace amounts of sulfamate compound result in a film having a coercivity of about 510 and 0.2M sulfamate compound results in a film having a coercivity of about 1.6 Oe, any specific concentration of sulfamate compound in said plating solution resulting in a corresponding specific coercivity as a result of the proportional relationship between sulfamate concentration and coercivity, said variation in coercivity of said Co(P) film being achieved by varying the concentration of said sulfamate compound while concurrently holding constant the concentration of reactants, complexing agents, —OH, pH, of said plating solution and the temperature thereof and agitation during plating.

2. The method defined in claim 1 wherein the source of cobalt ions is selected from the group consisting of cobalt sulfate, cobalt chloride and cobalt acetate.

3. The method defined in claim 1 wherein the source of citrate ions is selected from the group consisting of sodium citrate and potassium citrate.

4. The method defined in claim 1 wherein the source of hypophosphite ions is selected from the group consisting of sodium hypophosphite and potassium hypophosphite.

5. The method defined in claim 1 wherein the buffering compound is boric acid.

6. The method defined in claim 1 wherein the source of hydroxide anions is selected from the group consisting of sodium hydroxide and potassium hydroxide.

7. The method defined in claim 1 wherein said plating solution contains a surfactant.

8. The method defined in claim 7 wherein said surfactant is present in amount of between about 0.05 and 2.0 g/liter.

9. The method defined in claim 1 wherein said plating solution contains a stabilizer.

10. The method defined in claim 9 wherein said stabilizer is selected from a lead salt or a thio compound.

11. The method defined in claim 10 wherein said lead salt is selected from the group consisting of lead acetate and lead nitrate and is present in amounts between 0.1 and 2.0 ppm.

12. The method defined in claim 10 wherein said thio compound is thiodiglycolic acid and is present in amounts of between about 20 and 40 ppm.

13. The method defined in claim 1 wherein said plating operation is carried out at a temperature of between about 30° and 80° C. for a sufficient time to obtain the desired thickness.

* * * * *